Patented July 9, 1935

2,007,328

UNITED STATES PATENT OFFICE 2,007,328

GONAD-STIMULATING SUBSTANCE AND PROCESS OF PRODUCING IT

Harold H. Cole and Harold Goss, Davis, Calif.

No Drawing. Application March 10, 1932, Serial No. 598,086

2 Claims. (Cl. 167—74)

It is the object of our invention to produce in a relatively potent form from the blood-serum of pregnant mares a product which stimulates the sex sphere, and especially one which stimulates the gonads. When such a product is injected into immature animals, it causes a change by which their gonads are stimulated and their sex organs come to resemble those of mature animals.

One of us (Cole) and George H. Hart discovered that the blood of pregnant mares, especially during a certain intermediate stage of pregnancy, and the serum of such blood, contains a substance (hormone) which stimulates the sex sphere. They are applying for a patent on their discovery by an application of even filing date herewith, Serial No. 598,087.

We have discovered that it is possible to obtain this gonad-stimulating substance, which stimulates the sex sphere generally, in a fraction of the blood-serum of pregnant mares; so that thereby we are able to get the desired product in greater concentration, and free from much contaminating material which is co-present with it in the blood-serum in which it occurs.

If the blood or blood-serum of pregnant mares, or a suitable fraction of such blood-serum is administered parenterally, it is found to stimulate the sex sphere generally, and especially to stimulate the gonads, and to cause changes in immature animals by which their sex organs come to resemble those of mature animals. If administered to immature male animals, there results a marked development of the testes and a remarkable development of the accessory organs. If administered to immature females, it causes the formation of Graafian follicles and the appearance of corpora lutea, accompanied by simultaneous changes in the entire sex sphere.

This is easily recognized by tests on immature female rats. Such rats are normally weaned when about twenty-two days old; and practically never normally reach sexual maturity until they are at least thirty-five days old. If a potent fraction of the blood-serum of pregnant mares is administered parenterally to female rats twenty-three days old, or immediately after they have been weaned, either in one injection or in several injections over a period of three days, and the rats are killed at the end of one hundred hours after the first injection, the ovaries are found to be materially increased in size over those of controls, and in each of a majority of the treated rats there appears at least one corpus luteum.

This action is in contradistinction to that of the estrogenic principle or hormone, of Allen-Doisy and of Frank, which stimulates the secondary sex organs only and not the gonads directly.

As discovered by Cole and Hart, the mares' blood contains this sex-stimulating substance to some extent between the thirty-seventh day and the one hundred and thirtieth day of gestation; but it is particularly abundant between the forty-fifth day and the one hundredth day of gestation. This latter period during which the substance is markedly present in mares' blood is during that period of gestation when the fetus is between 2 and 22 cm. in length, which is more easily determinable in slaughtered mares than is the precise period of gestation as measured in days.

The blood from pregnant mares may be obtained in the usual manner of blood used for biological purposes, either from the live animal or from the slaughtered animal. The serum from such blood is separated from the remainder of the whole blood, also in any desired manner. To this point the procedure is the same as that described in the Cole and Hart application.

However, we go further, and obtain a potent fraction from the blood-serum thus obtained.

We accomplish this by fractional precipitation, desirably with salts. We have discovered that the potent material is part of the general protein fraction, or associated with it, and may be separated in a concentrated form by fractional-precipitation procedures, conveniently by salting out by using varying salt concentrations. Various salts may be used, such for instance as sodium sulphate, ammonium sulphate, and sodium chloride. We have discovered that the greater part of the potent material is that which is precipitated at an intermediate salt concentration, so that by fractional salting out it is possible to free this potent material either from the material which is precipitated at lower salt concentration, or from that material which is not precipitated at as low a salt concentration as that which precipitates the potent material, or from both.

The following is an example of this salting-out purification, using sodium sulphate as the salt:

To 100 g. of the blood-serum from pregnant mares at the proper stage of gestation is added enough solid sodium sulphate to make a sodium-sulphate concentration of from 14% to 18%, desirably about 16%. To facilitate the dissolving of the sodium sulphate it is desirable to warm the serum to between 35° and 40° C. The mixture is allowed to stand for from one to two hours, during which a precipitate settles out. This precipitate is removed in any convenient manner, as by filtering or centrifuging; and is found to contain little of the potent material, the greater part of such potent material remaining in the filtrate. This filtrate can be freed of the excess sodium sulphate, as by dialysis, and used as the potent fraction of the blood-serum.

However, instead of doing that we prefer to obtain a further purification. This further purification is obtained by adding additional sodium sulphate to the filtrate following the separation of the first precipitate, to obtain a sodium-sulphate concentration of between 20% and 25%, desirably about 22%; with sufficient warming of the mixture to ensure dissolving of the sodium sulphate. This mixture is again allowed to stand for from one to two hours, at about 28° C., during which time a second precipitate forms. This second precipitate contains the greater part of the potent material, and is suitably separated from the remaining liquid, as by filtering or centrifuging.

This second precipitate is taken up in water, and may be used directly. However, since this second precipitate usually contains some sodium sulphate, it is desirably treated in any suitable way to remove such sodium sulphate, as by dialysis. This purified material is found to be quite highly potent.

If desired, although the purification is not so great, enough sodium sulphate may be added initially to the blood-serum to make the sodium-sulphate concentration between 20% and 25%. The precipitate which is thus produced includes both the first and second precipitates of the procedure above outlined, but leaves in solution inert matter which is not precipitated at the salt concentration used. The precipitate thus obtained may be taken up in water, freed of sodium sulphate, and used as the potent material.

Any of the potent fractions obtained above of the blood-serum is found to have a sex-stimulating potency of at least 80% of the original mares' blood-serum from which it is derived, but to contain not to exceed 50% of the total solids of such original blood-serum. The fraction which is obtained by the preferred process above described, as the second precipitate, is found to have a potency of at least 50% of the original mares' blood-serum, and usually about 75% thereof, but to contain not to exceed 20% of the total solids of such original blood-serum, and usually not to exceed 10% thereof. Any of the potent fractions above described are found to have the capacity when injected in sufficient qualities into each of a group of female rats twenty-two days old of producing in one hundred hours an average weight of ovaries exceeding 200 mg. per rat, and of stimulating the sex-sphere generally, and especially the gonads, and of causing changes in immature rats by which their sex organs come to resemble those of mature animals. The solids obtained as potent fractions of the blood-serum are found to have sufficient potency so that a solution of between 0.2 mg. and 4 mg. of any of them has the capacity when injected in fractional doses over a period of three days into each of a group of female rats twenty-two days old to produce within one hundred hours from the first injection at least one corpus luteum in each of at least half of the treated rats; while in the more potent fraction, obtained as the second precipitate in the process that provides two precipitates, a solution of between 0.1 mg. and 2 mg. is found to have this capacity. The apparent wide range given in the amount of the precipitate which has this capacity is on account of the difference in the amount of potent materials in the original blood, depending upon the precise state of gestation at which the blood is obtained.

The blood of pregnant mares is apparently substantially free from any growth-promoting hormone, and so is the gonad-stimulating product which we obtain from such blood.

Our product is indicated in various deficiency disorders and subnormal developments of the sexual system, both male and female. It induces ovulation and produces estrum, as has been shown by tests on various female test animals, such as the rat, mouse, cow, and ewe. It repairs libido sexualis, as has been shown by tests on impotent male animals, such as rats, rams, and stallions, and has enabled such males to breed. Through its control of the gonads, it has been shown by tests on these animals to stimulate the secondary sex organs and the sex behavior.

As our product is tested by its effect in producing enlargement of the ovaries in immature rats, and in causing the appearance of corpora lutea in said ovaries, and as it is obtainable from mares' blood only when the mares are pregnant, our invention furnishes a valuable means for testing mares for pregnancy before other indications give any certain information thereof. For such a test, as to determine whether a service by a stallion has been successful to produce pregnancy, and thus to avoid loss of valuable breeding time in the mare's life, blood is taken from the mare about two months after the stallion's service, and a product obtained therefrom in accordance with our procedure is tested by being administered parenterally to immature female rats. If the ovaries of the rats, when the rats are killed after 100 hours after the first injection, are found to be materially increased in size over those of controls, and if corpora lutea appear in the majority of the test rats, the mare under observation is pregnant; but if the rat test is negative, and the rat ovaries are not increased in size and there are no corpora lutea, the mare has not become pregnant; in which case, in order to avoid the waste of valuable breeding time, another service by the stallion may be had.

We claim as our invention:

1. The process of obtaining a product having properties of stimulating the gonads of males and females from serum of blood of pregnant mares, which comprises adding to serum of blood from pregnant mares obtained between the thirty-seventh day and the one hundred and thirtieth day of gestation a salt such as sodium sulphate, ammonium sulphate and sodium chloride to form a solution having a salt concentration of from 14% to 18%, removing the precipitate from said solution, adding to the filtrate from said solution a further quantity of said salt to form a second solution having a salt concentration of between 20% and 25% and recovering the precipitate from said second solution.

2. The process of obtaining a product having properties of stimulating the gonads of males and females from serum of blood withdrawn from pregnant mares, which consists in adding to serum of blood withdrawn from pregnant mares between the thirty-seventh day and the one hundred and thirtieth day of gestation a salt such as sodium sulphate, ammonium sulphate or sodium chloride to form a solution having a salt concentration of between 14% and 16%, heating said solution to between 35° C. and 40° C., and removing the relatively inert precipitate from said solution, the greater part of the potent material remaining in the filtrate.

HAROLD H. COLE.
HAROLD GOSS.